United States Patent
Perazolo et al.

(10) Patent No.: US 7,539,658 B2
(45) Date of Patent: May 26, 2009

(54) RULE PROCESSING OPTIMIZATION BY CONTENT ROUTING USING DECISION TREES

(75) Inventors: Marcelo Perazolo, Cary, NC (US); Ana C. Biazetti, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 11/428,869

(22) Filed: Jul. 6, 2006

(65) Prior Publication Data
US 2008/0010231 A1    Jan. 10, 2008

(51) Int. Cl.
G06N 5/02 (2006.01)
G06N 5/04 (2006.01)
G06K 9/62 (2006.01)

(52) U.S. Cl. .................................. 706/48; 382/226
(58) Field of Classification Search .................. 706/48; 382/226
See application file for complete search history.

(56) References Cited

U.S. PATENT DOCUMENTS

| 5,799,311 A | 8/1998 | Agrawal et al. |
| 6,563,952 B1 | 5/2003 | Srivastava et al. |
| 6,631,361 B1 * | 10/2003 | O'Flaherty et al. ............ 706/47 |
| 6,947,936 B1 | 9/2005 | Suermondt et al. |

OTHER PUBLICATIONS

Pouget et al., Alert Correlation: Review of the state of the art, 2003.*
Chaudhuri et al. (Chaudhuri), Extracting Predicates From Mining Models for Efficient Query Evaluation, 2004.*
Kruegel et al., Using Decision Trees to Improve Signature-Based Intrusion Detection, 2003.*
Turksen et al., An Equivalence between Inductive Learning and Pseudo-Boolean Logic Simplification: A Rule Generation and Reduction Scheme, 1993.*
JP360262290A. Publication Date: Dec. 25, 1985. "Information Recognition System". (Abstract Only).
www.megaputer.com/products/pa/algorithms/dt.php3.
http://www.driverheaven.net/archive/index.php/t-56615.html.

* cited by examiner

*Primary Examiner*—David R Vincent
*Assistant Examiner*—Nathan H Brown, Jr.
(74) *Attorney, Agent, or Firm*—Cantor Colburn LLP; Stephen Calogero

(57) ABSTRACT

A classifier, method and computer program product for categorizing events within a data stream includes a correlation engine having at least one set of rules, the rules including event selectors with logical expressions corresponding to a plurality of attributes for the events within the data stream; the engine also including a decision tree built by the engine for providing an index of the rules, wherein the engine references the decision tree to access selected rules corresponding to the events and applies the selected rules to correlate the events.

15 Claims, 3 Drawing Sheets

RULE PROCESSING OPTIMIZATION BY CONTENT ROUTING USING DECISION TREES

BACKGROUND OF THE INVENTION

1. Field of the Invention

This invention relates to techniques for managing data and particularly to an event correlation engine for managing different rules which process events for correlation purposes.

2. Description of the Related Art

A typical correlation engine has hundreds or thousands of different rules that must be applied for evaluation of incoming events. Normally, only some of the rules are computed or evaluated for each event. Processing all of the rules would dramatically reduce the efficiency of the correlation engine and cause low performance. Presently, one way for avoiding such performance issues is to categorize incoming events by using an "event type" attribute. This technique, and similar techniques, call for classifying each rule by the event type accepted by the respective rule. These classification techniques provide one way to improve processing performance. Unfortunately, these techniques also expose classification of the events to the rules definition language, thereby decreasing efficiency. With the growing complexity of information systems and the growing need for analysis power, techniques for classification relying on a single attribute will soon be outmoded. The soon to be realized obsolescence thus calls for classification involving multiple attributes.

What is needed is a low overhead technique for improving the performance of event correlation engines. Preferably, the technique is not based on event type classification alone and does not require any changes to rule representation languages. The technique should also support multi-dimensional classification, thus providing for improved accuracy regarding possible rules (a subset of target rules to be evaluated) for each event processed in the correlation engine. When the correlation engine implements the technique, the correlation engine should support a much larger set of rules with better performance results than is possible with current technologies.

One example of a prior art technique is disclosed in U.S. Pat. No. 6,563,952 B1, entitled "Method and Apparatus for Classification of High Dimensional Data', issued May 13, 2003, to Srivastava et al. This patent discloses, an apparatus and method for classifying high-dimensional sparse datasets.

SUMMARY OF THE INVENTION

The shortcomings of the prior art are overcome and additional advantages are provided through the provision of a computer implemented system for correlating events within a data stream, that includes a correlation engine having at least one set of rules, the rules including event selectors having logical expressions corresponding to a plurality of attributes for the events within the data stream; the engine also having a decision tree built by the engine using an offline analysis of rule predicates for providing an index of the rules, wherein the engine references the decision tree to access selected rules corresponding to the events and applies the selected rules to correlate the events.

Also disclosed is a method for correlating events within a data stream, that includes: selecting the data stream for correlation of the events therein; selecting a correlation engine adapted for building a decision tree and correlating the events; evaluating a set of rules loaded in the correlation engine to determine a set of event attributes for the decision tree; building a decision tree for indexing the at least one set of rules; using the correlation engine, referencing the decision tree to access selected rules corresponding to the events; and applying the selected rules to correlate the events.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which is a computer program product stored on machine readable media, the product having instructions for classifying events within a data stream, by: selecting the data stream for categorizing of the events therein; selecting a correlation engine adapted for building a decision tree and classifying the events; evaluating a set of rules loaded in the correlation engine to determine a set of event attributes for the decision tree; building a decision tree for indexing the at least one set of rules, wherein building the decision tree comprises evaluating a set of rules which logical expressions include plurality of event attributes comparison; using the correlation engine, referencing the decision tree to access selected rules corresponding to the events, wherein referencing the decision tree comprises evaluating at least one of a logical AND operation, an OR operation and a NOT operation; and applying the selected rules for correlating the events.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed herein are techniques for providing multi-attribute classification of event correlation rules using a correlation engine. As used herein, "event correlation rules" applies to rules useful for the correlation of event data in a stream of data, while the term "event" makes reference to a significant autonomic occurrence which includes certain data that complies with user criteria. The event correlation rules are implemented using the correlation engine.

The teachings herein provide for multi-attribute (also referred to as "multi-dimensional") classification (also referred to as categorization) of event correlation rules. These teachings provide for a more efficient analysis of events (i.e., relevant data in the data stream).

Figure 1:
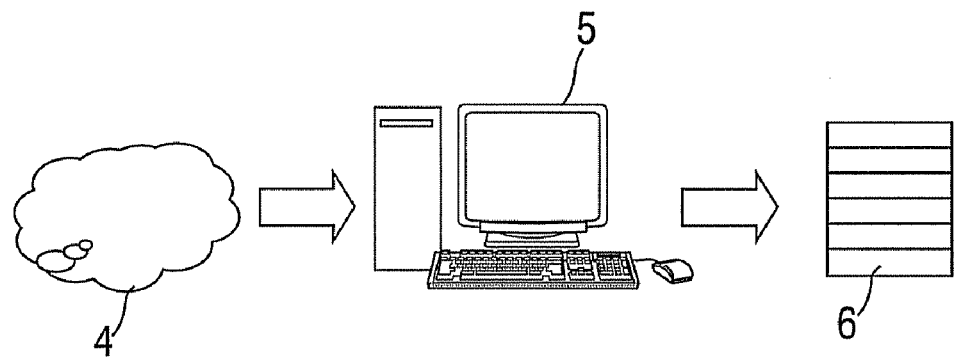
FIG. 1 illustrates exemplary components for implementation of a correlation engine.

Turning now to the drawings in greater detail, it may be seen that in FIG. 1 there is a processing system 5 for processing events 4. In various embodiments, the processing system 5 includes at least one processor, storage, memory, user interfaces, network connectivity, a power supply and other devices as are known in the art. Typically, the correlation engine is stored within the processing system 5 as a software product. The correlation engine includes various machine readable instructions for processing events 4 in accordance with the teachings herein.

The events 4 typically include a stream of data fed to the processing system 5 for correlation. By way of the correlation engine, the processing system 5 provides correlated data 6 from the events 4.

Figure 2:
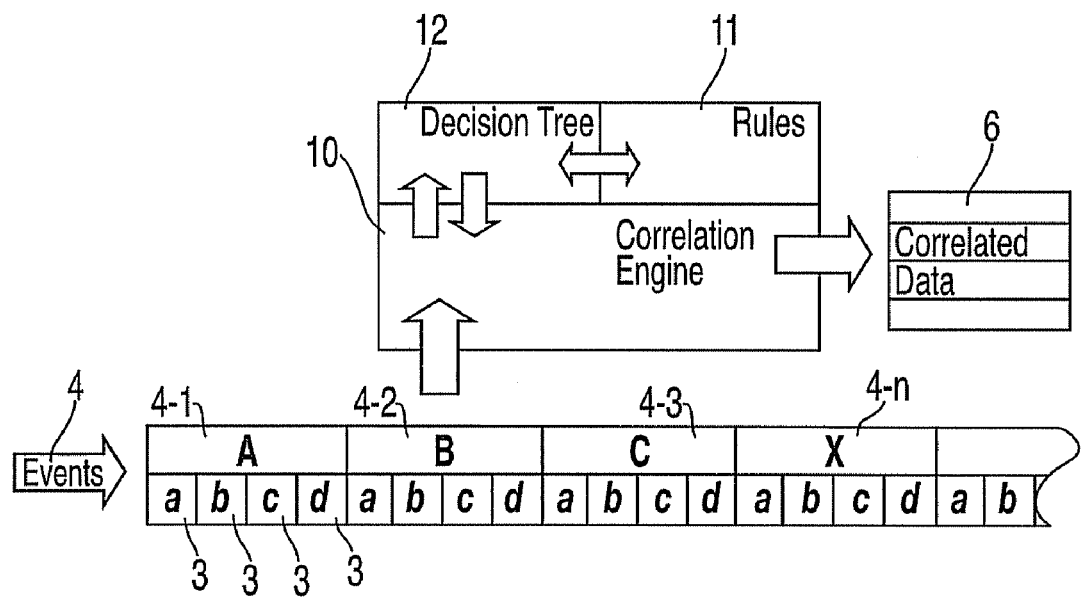
FIG. 2 illustrates aspects of the correlation engine.

Referring now to FIG. 2, aspects of the correlation engine 10 are shown in greater detail. That is, the correlation engine 10 includes a plurality of rules 11 for evaluating the events 4. The events 4 include a plurality of events (denoted as 4-1, 4-2, 4-3, 4-n). Each event 4 within the plurality of events 4 is characterized by a plurality of attributes 3 (denoted as a, b, c, d).

The efficiency of the correlation engine 10 is realized by, among other things, support of multiple attributes 3 in the classification of relevant rules 11. For example, in some embodiments, the correlation engine 10 provides for use of an event type attribute 3 and a semantic equivalent. For example, events 4 may be classified by attributes 3 such as "situation", "hostname", "origin", etc...

In order to illustrate aspects of the correlation engine 10, consider aspects of set theory. Selecting the rules that apply for a given event is similar to the problem of finding the intersection of multiple sets in a complex space of variables. One aspect of the present invention is the application of concepts related to and derived from set theory to the specific problem of finding the correct set of rules 11 that apply for a given event.

The content routing taught herein is used to find the correct set of rules 11 to relate to an event 4. Typically, each rule 11 is related to the event by way of a logical expression. The logical expression can take on various properties, may be complex and is not limited to combinations of conditions (that is, as an analogy, combinations realized with AND logical operations).

The teachings herein address the problem of finding the intersection (or "nodes" of the decision tree 12) of various sets of possible rules 11 by applying an algorithm structured as a decision tree 12. The decision tree 12 provides for indexing each rule 11 in at some intersection in the decision tree 12. This technique provides for direct access to the rules 11 that exist for each intersection, making the task of finding rules 11 very efficient. An exemplary decision tree 12 is provided in FIG. 3, which is now discussed in greater detail.

Figure 3:
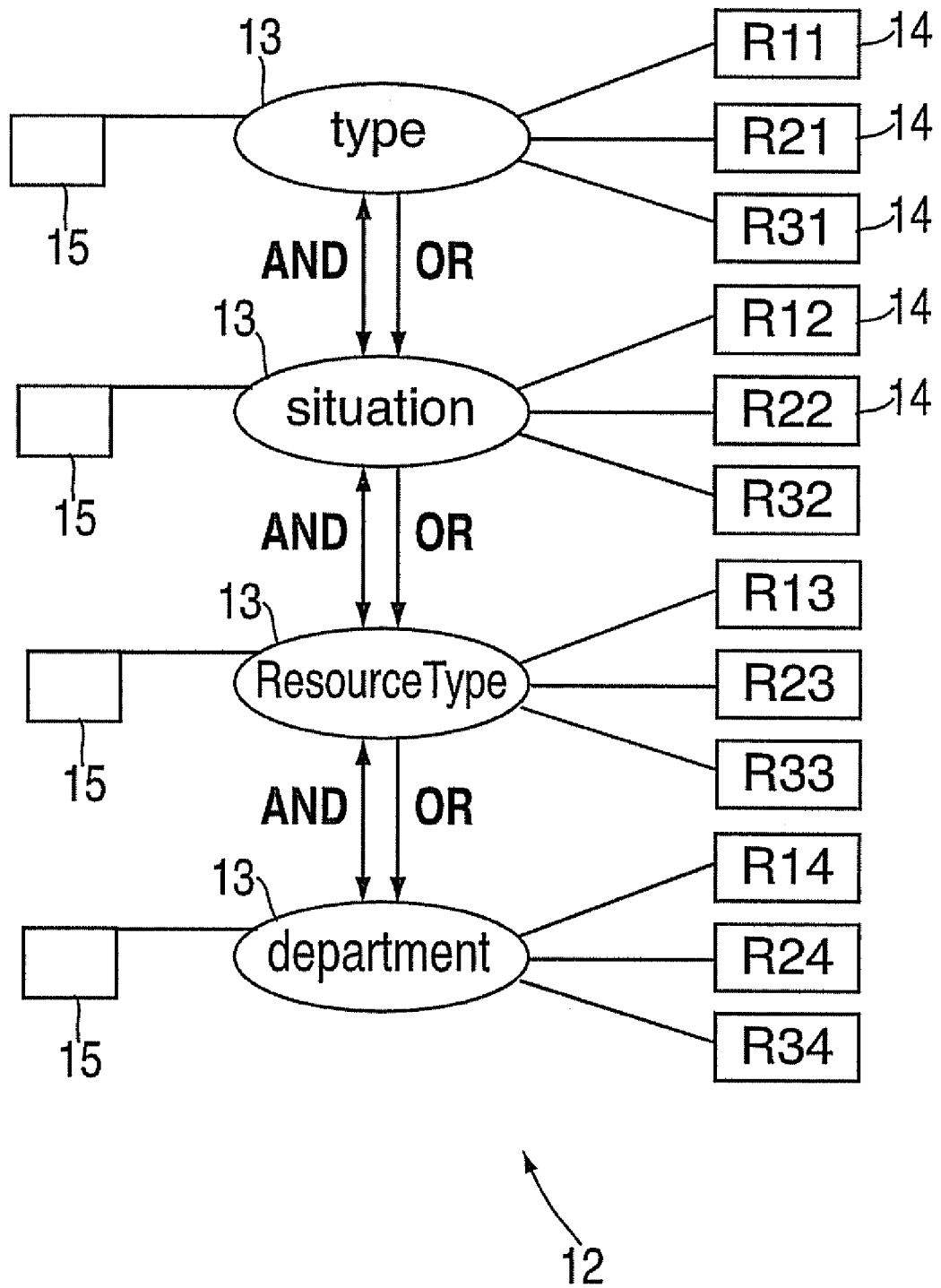
FIG. 3 illustrates aspects of a decision tree of the correlation engine.

Referring to FIG. 3, the decision tree 12 provides the algorithm for analyzing the rules 11 that are loaded in the correlation engine 10. Further, the decision tree 12 reduces the expressions to be evaluated for rule selection regarding attributes 3 that are commonly evaluated. In the embodiment presented herein, each intersection in the attributes 3 is represented as a node 13 in the decision tree 12. Also, for each node 13, a node table 15 is typically created to list operators and values associated with the attribute 3. Rules 11 are then appended to the decision tree 12 as leaves 14.

When an event 4 is evaluated by the correlation engine 10, the decision tree 12 is scanned. The correlation engine 10 refers to the decision tree 12 and checks if the event 4 includes the attribute(s) 3 specified in each the node 13 of the decision tree 12. If the event 4 includes the attribute(s) 3, the correlation engine 10 checks the event 4 against the operators and values in the node table 15.

Evaluation of the decision tree 12 typically proceeds in a sequential manner. When the operand between two nodes 13 is a logical AND operation, then by traversing the decision tree 12 to the next node 13 means that an expression is true up to this point (i.e., the AND operation succeeded and the correlation engine 10 should continue evaluation of the decision tree 12). In the case where the operand is a logical OR operation, the correlation engine 10 will continue evaluation of the decision tree 12 even if the attribute 3 did not match the values in the node table 15, since a different node 13 can still produce a true result. Accordingly, each rule 11 will call for re-evaluation when a leaf 14 is reached.

Typically, the logical expressions of each rule are reduced to a combination of logical AND, OR and NOT operations.

An example of the algorithm is presented below and in conjunction with FIG. 3. In this example, AND logical operations are employed for simplification (with OR operations also depicted in FIG. 3). Of course, it should be noted that more complex expressions incorporating OR logical operations as well as other operations can be supported.

Consider the following rules and event format in conjunction with FIG. 3.

```
Event attributes:
        type
        situation
        resourceType
        department...
Rules (Knowledge Base)
        R11: if ((type = DISK_PROBLEM) &&(situation = REPORT) &&(resourceType = DB2_SERVER) &&
        (department = FINANCE_DEPT)) then ACTION 1.1
        R21: if ((type = DISK_PROBLEM) &&(situation = REPORT) &&(resourceType = DB2_SERVER) &&
        (department = MARKETING)) then ACTION 2.1
        R31: if ((type = DISK_PROBLEM) &&(situation = REPORT) &&(resourceType = DB2_SERVER) &&
        (department = ENGINEERING)) then ACTION 3.1
        ...
        R12: if ((type = DISK_PROBLEM) &&(situation = REPORT) &&(resourceType = WAS_SERVER) &&
        (department = FINANCE_DEPT)) then ACTION 1.2
        R22: if ((type = DISK_PROBLEM) &&(situation = REPORT) &&(resourceType = WAS_SERVER) &&
        (department = MARKETING)) then ACTION 2.2
        R32: if ((type = DISK_PROBLEM) &&(situation = REPORT) &&(resourceType = WAS_SERVER) &&
        (department = ENGINEERING)) then ACTION3.2
```

-continued

```
...
R13: if ((type = DISK_PROBLEM) &&(situation = METRICS) &&(resourceType = DB2_SERVER) &&
    (department = FINANCE_DEPT)) then ACTION 1.3
R23: if ((type = DISK_PROBLEM) &&(situation = METRICS) &&(resourceType = DB2_SERVER) &&
    (department = MARKETING)) then ACTION 2.3
R33: if ((type = DISK_PROBLEM) &&(situation = METRICS) &&(resourceType = DB2_SERVER) &&
    (department = ENGINEERING)) then ACTION 3.3
...
R14: if ((type = DISK_PROBLEM) &&(situation = METRICS) &&(resourceType = WAS_SERVER) &&
    (department = FINANCE_DEPT)) then ACTION 1.4
R24: if ((type = DISK_PROBLEM) &&(situation = METRICS) &&(resourceType = WAS_SERVER) &&
    (department = MARKETING)) then ACTION 2.4
R34: if ((type = DISK_PROBLEM) &&(situation = METRICS) &&(resourceType = WAS_SERVER) &&
    (department = ENGINEERING)) then ACTION 3.4
    ...
and so on...
```

Consider first, that if the correlation engine 10 were tailored to detect a set of candidate rules 11 solely based on the attribute 3 for event type, a large set of candidate rules 11 would result. In this case, classification would require that each rule 11 be evaluated in turn to determine the matching rules 11.

In the present example, suppose ten (10) variations for "situation" are included, thirty (30) variations for "resourceType" are also included, and another ten (10) variations for "department" are included. In this example, for a same event type, the number of different rules 11 would be 10*30*10, or 3000 different rules 11 to evaluate for each event of type "DISK_PROBLEM".

When a given event 4 arrives, the correlation engine 10 walks through the decision tree 12 evaluating the logical expression against the event at hand until it refers to a point in the decision tree 12 that corresponds to the values for all four associated attributes 3. Instead of evaluating all 3000 of the potential rules 11 based on the type of the event 4, the correlation engine 10 would determine which rules intersect with the event 4 being processed. The rules 11 at the point of intersection (i.e., the node 13 of interest) are typically a much smaller number of rules when compared to prior art techniques, since the teachings herein provide for categorizing events 4 by multiple variables (multi-dimensional categorization).

It should be noted that the number of attributes 3 selected for categorization will effect aspects of performance. For example, there is a trade-off between a bigger indexing time and storage, as opposed to a bigger set of rules to evaluate at the node 13 in the decision tree 12.

As another example, suppose an event 4 includes forty (40) different attributes. If the event 4 is indexed by all forty (40) possible attributes, performance of the correlation engine 10 would suffer. That is, an excessive amount of storage and time would be required to hold all possible node 13 combinations and to process each evaluation. This, of course, is not a practical approach.

Instead, a balance is drawn. For example, an implementation of the decision tree creation would determine which of attributes 3 present the best alternatives for categorization of events 4 and rules 11. Attributes 3 such as situation, resourceType, and event type are used as examples. For this example, other more specific attributes such as log_size or memory_address may not be too common and are specific to individual problems, thus making them bad candidates for categorization of events 4. Such categorization can be done automatically by the indexing process. One example of automatic indexing simply calls for counting how many predicates appear for each attribute 3 in the rules 11 being indexed. The attributes 3 that show up most frequently are selected as the attributes 3 for categorization.

As an example of indexing for multi-attribute events 4, a simple decision tree 12 is provided. For simplicity, the same knowledge base as the prior example is used, and three of the categorization attributes are considered:

```
(type = DISK_PROBLEM)
(situation = REPORT)
(resourceType = DB2_SERVER)
R11 - (department = FINANCE_DEPT)) then ACTION 1.1
R21 - (department = MARKETING)) then ACTION 2.1
R31 - (department = ENGINEERING)) then ACTION 3.1
...
(resourceType = WAS_SERVER)
R12 - (department = FINANCE_DEPT)) then ACTION 1.2
R22 - (department = MARKETING)) then ACTION 2.2
R32 - (department = ENGINEERING)) then ACTION 3.2
...
...
(situation = METRICS)
(resourceType = DB2_SERVER)
R13 - (department = FINANCE_DEPT)) then ACTION 1.3
R23 - (department = MARKETING)) then ACTION 2.3
R33 - (department = ENGINEERING)) then ACTION 3.3
...
(resourceType = WAS_SERVER)
R14 - (department = FINANCE_DEPT)) then ACTION 1.4
R24 - (department = MARKETING)) then ACTION 2.4
R34 - (department = ENGINEERING)) then ACTION 3.4
...
```

Notice that since the categorization attributes 3 are part of the decision tree 12 already, there's no need to re-evaluate them once the rules 11 are picked. One technique for optimization includes expunging these attributes 3 from this set of rules 11.

As a comparison, suppose an event EV1 arrives:

```
type = DISK_PROBLEM
situation = METRICS
resourceType = WAS_SERVER
department = MARKETING
```

In the traditional approach of single categorization (for example, by eventType), all 3000 rules would require evaluation. For example, where (type=DISK_PROBLEM) is a predicate. This would require the evaluation of at least 3000+ extra predicates (and typically much more).

By applying the teachings herein, a number of evaluations would be:

```
n <= 10 predicates to determine the (type = DISK_PROBLEM) node
m <= 10 predicates to determine the (situation = METRICS) node
o <= 30 predicates to determine the (resource = WAS_SERVER) node
p <= 10 predicates to match all the rules in the resulting intersection
(R14, R24, R34, ...)
Total = n + m + o + p = 60 predicates (in the worst case analysis)
```

One skilled in the art will recognize that this technique provides for improved performance.

Stated in more broad terminology, the teachings herein provide for an aggregation of the sets of rules 11, wherein the aggregation is indexed by multiple attributes 3, where each rule 11 is based on a categorization according to one or more attributes 3.

That is, existing algorithms may be used to create the decision tree 12 that uses correlation rules as input. The decision tree 12 is referenced by the correlation engine 10 at runtime for the processing of events 4 according to the rules 11. The decision tree 12 that is created for each application considers logical predicates rather than only data value records. That is, the logical predicate is a predicate that is used to check on a logical condition regarding a specific attribute 3, and returns a result of either "true" or "false." A general form for the logical predicate is an "attribute operator value", such as "X<5."

Typically, the correlation engine 10 builds the decision tree 12 by using an offline analysis of rule predicates for providing an index of the rules 11. As used herein, "offline" means that this analysis and indexing is performed before the events 4 are processed (online versus offline).

The teachings herein provide for traversing (evaluating) the decision tree 12 in a manner to account for multiple types of logical operations (AND, OR and NOT). That is, evaluation of the decision tree 12 with the correlation engine 10 is not limited to sequential paths resulting from binary combinations.

Figure 4:
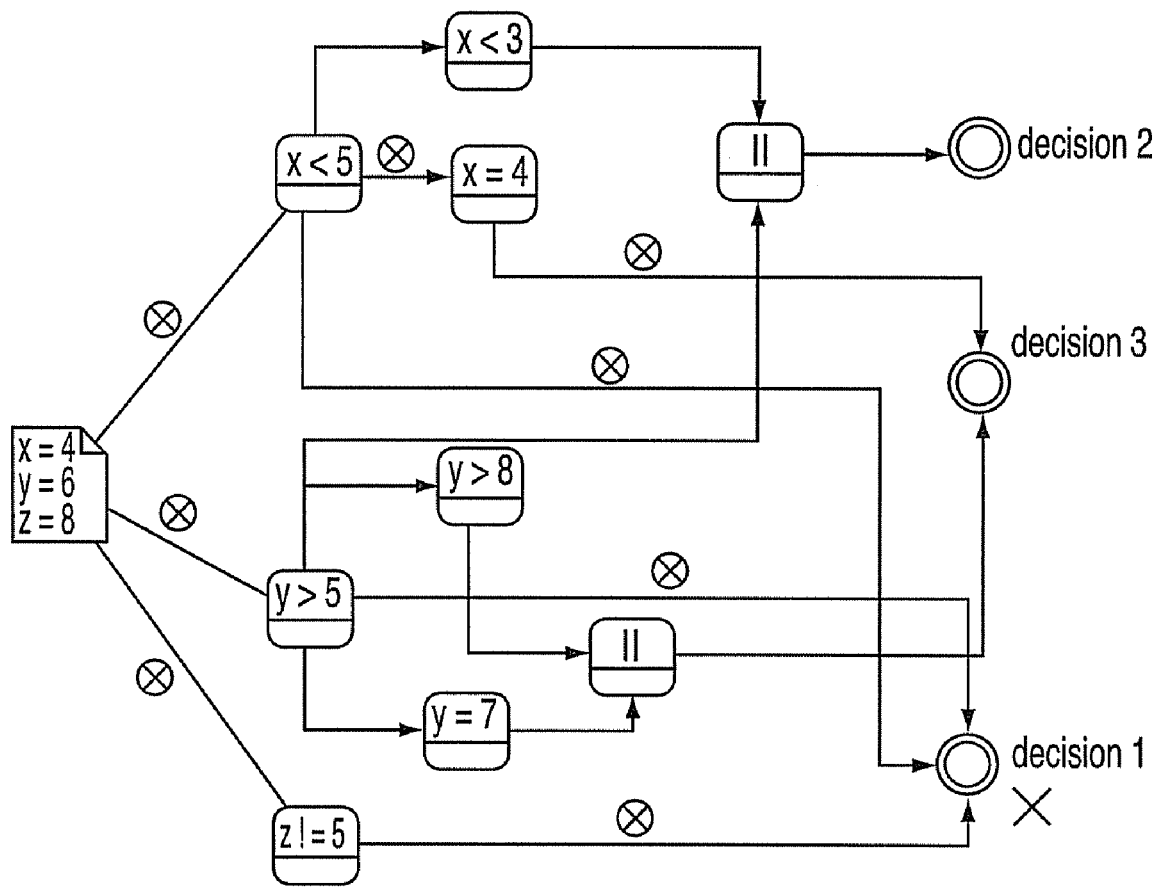
FIG. 4 depicts a logic analysis provided by the correlation engine.

Exemplary logic for an operation of the correlation engine 10 is provided in FIG. 4. Note that in FIG. 4 (and as used elsewhere herein), the "&&" operator represents the "AND" operator. Also, "||" represents the "OR" operator, "!" represents the "NOT" operator, "=>" represents "implies". Also in FIG. 4, the circled "x" marks correspond to a path taken by the decision logic when selecting rules in the decision tree— ultimately leading to the rule with the large "X" mark. The use of this annotation is provided only for illustration and a better understanding of FIG. 4.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented system for correlating events within a data stream, comprising:
    an input for receiving the data stream;
    and a processor comprising machine executable instructions stored on machine executable media, the instructions providing a correlation engine comprising at least one set of rules, the rules comprising event selectors having logical expressions corresponding to a plurality of attributes for the events within the data stream; the engine also comprising a decision tree built by the engine using an offline analysis of rule predicates for providing an index of the rules, wherein the engine references the decision tree to access selected rules corresponding to the events and applies the selected rules to correlate the events, wherein the rules are selected to provide a balance in performance determined according to selected attributes from the plurality of attributes;
    and an output for providing correlated events to a user.

2. The computer implemented system as in claim 1, wherein an intersection between logical expressions in multiple rules is represented as a node in the decision tree.

3. The computer implemented system as in claim 2, wherein each rule within each set of rules is maintained as a leaf of a respective node for the set of rules.

4. A method for correlating events within a data stream, comprising:
    selecting the data stream for categorizing of the events therein, each of the events comprising at least one attribute;
    selecting a correlation engine adapted for building a decision tree and correlating the events;
    evaluating a set of rules loaded in the correlation engine to determine a set of event attributes for the decision tree, wherein the set of rules is selected to provide a balance in performance determined according to at least one selected attribute for each of the events;
    building a decision tree for indexing the at least one set of rules;
    using the correlation engine, referencing the decision tree to access selected rules corresponding to the events; and
    applying the selected rules for correlating the events; and
    providing correlated events to a user as a result.

5. The method as in claim 4, wherein building the decision tree comprises evaluating a plurality of attributes for each rule.

6. The method as in claim 4, wherein the engine applies at least one algorithm to build the decision tree.

7. The method as in claim 4, wherein referencing the decision tree comprises evaluating at least one of a logical AND operation, an OR operation and a NOT operation.

8. The method as in claim 4, wherein building the decision tree comprises evaluating a logical predicate of a respective rule.

9. The method as in claim 8, wherein evaluating a logical predicate comprises determining one of a true condition and a false condition.

10. A computer program product stored on machine readable media, the product comprising machine executable instructions for correlating events within a data stream, by:
   selecting the data stream for correlation of the events therein;
   selecting a correlation engine adapted for building a decision tree and classifying the events;
   evaluating a set of rules loaded in the correlation engine to determine a set of event attributes for the decision tree, wherein the set of rules is selected to provide a balance in performance determined according to at least one selected attribute for each of the events;
   building a decision tree for indexing the at least one set of rules, wherein building the decision tree comprises evaluating a plurality of attributes for each event in the at least a portion of the data stream;
   using the correlation engine, referencing the decision tree to access selected rules corresponding to the events, wherein referencing the decision tree comprises evaluating at least one of a logical AND operation, an OR operation and a NOT operation; and
   applying the selected rules for correlating the events; and outputting correlated events to a user.

11. The computer program product as in claim 10, wherein building the decision tree comprises evaluating a plurality of attributes for each rule.

12. The computer program product as in claim 10, wherein the engine applies at least one algorithm to build the decision tree.

13. The computer program product as in claim 10, wherein referencing the decision tree comprises evaluating at least one of a logical AND operation, an OR operation and a NOT operation.

14. The computer program product as in claim 10, wherein building the decision tree comprises evaluating a logical predicate of a respective rule.

15. The computer program product as in claim 14, wherein evaluating a logical predicate comprises determining one of a true condition and a false condition.

* * * * *